United States Patent [19]

Komatsubara et al.

[11] 4,416,432
[45] Nov. 22, 1983

[54] CASSETTE BRAKING MECHANISM

[75] Inventors: Masahiro Komatsubara; Tetsuro Kamimura; Takugi Inanaga; Akira Takahashi, all of Kawagoe, Japan

[73] Assignee: Pioneer Electronic Corporation, Tokyo, Japan

[21] Appl. No.: 335,317

[22] Filed: Dec. 29, 1981

[30] Foreign Application Priority Data

Dec. 29, 1980 [JP] Japan ............... 55-187926[U]
Dec. 29, 1980 [JP] Japan ............... 55-187927[U]

[51] Int. Cl.³ ............... B65H 23/08; G11B 15/43; G11B 15/32
[52] U.S. Cl. ............... 242/199; 242/75.4; 242/204
[58] Field of Search ............... 242/199, 198, 204, 203, 242/202, 201, 75.4, 197, 200; 188/163

[56] References Cited

U.S. PATENT DOCUMENTS 3,257,086 6/1966 Drenning ............... 242/75.4
3,367,592 2/1968 Smith ............... 242/200 X
3,691,312 9/1972 Petersen ............... 242/199 X

FOREIGN PATENT DOCUMENTS 2633999 2/1978 Fed. Rep. of Germany ..... 242/75.5
732992 5/1980 U.S.S.R. ............... 242/204

Primary Examiner—Stuart S. Levy
Assistant Examiner—Scott J. Haugland
Attorney, Agent, or Firm—Sughrue, Mion, Zinn, Macpeak, and Seas

[57] ABSTRACT

A braking force is applied to a cassette supply reel during periods of vertical vibration to decrease tape resonance and improve wow characteristics. The braking force can be applied either axially or radially.

10 Claims, 29 Drawing Figures

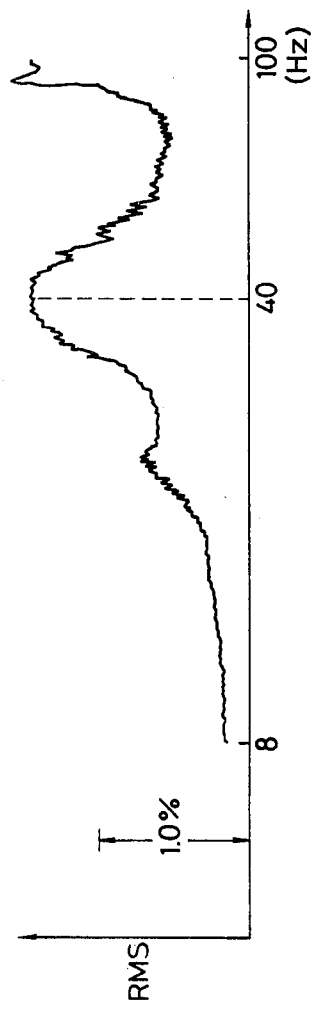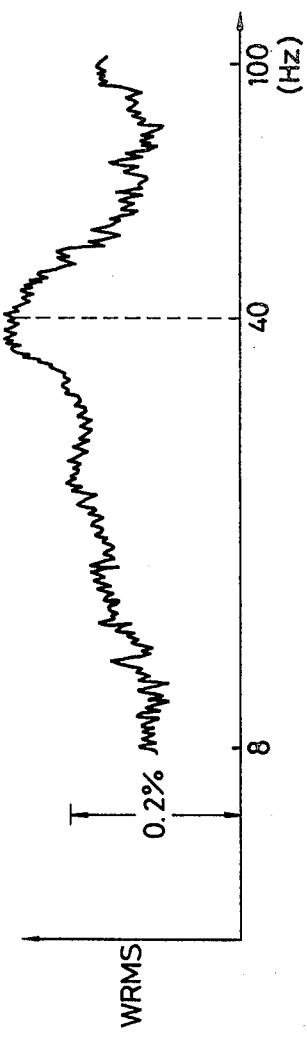

CASSETTE BRAKING MECHANISM

BACKGROUND OF THE INVENTION

The present invention relates to a cassette tape recorder for automatic stereo sets.

It is well known from experience that an ordinary cassette tape recorder may produce a high quality sound when a vehicle in which the cassette tape recorder is installed is in a stationary condition but that the same tape recorder may produce a poor quality sound when the vehicle is in motion and is experiencing large up-and-down vibrations. It is also known that, particularly when the remainder of tape to be played is large, wow is increased to thereby result in a poor quality sound reproduction.

Various studies of this wow phenomenon have been made by the present inventors. In one experiment, an up-and-down vibration of 1 G was applied to an ordinary cassette tape recorder at a changing frequency, and the resulting wow was measured. The results are shown in FIG. 1, which is a graph showing the wow (RMS) characteristics vs. frequency. As is apparent from the characteristic curve, wow exceeding 1% was generated at vibration of 40 Hz and also at 100 Hz or more. These characteristics were measured in another way, that is, in an auditory sense compensation, and the results were as shown in FIG. 2. The wow generated at the vibration of 100 Hz or more was less than 0.2% and caused no problem, but the wow generated at about 40 Hz was still more than 0.2%, which caused the quality of sound to be degraded.

Detailed analyses of the wow at 40 Hz were then made, which can be understood with reference to the structures of a conventional tape recorder and the tape cassette and operations thereof as will be explained in detail with reference to FIGS. 3 through 8.

Referring first to FIGS. 3 and 4, a tape cassette case generally designated by reference numeral 1 is made up of cassette halves 1a and 1b and a tape 2 encased therein. The tape 2 is fixed at either end to a pair of reels 3a 3b by means of respective clampers 4a and 4b, so that the tape can be wound onto the reels 3a and 3b. Thus, the when the winding diameter of tape on one side is increased, the winding diameter of tape on the other side is decreased. In the drawings, the tape is fully wound on supply reel 3b. It is a typical feature of the tape cassette that no flanges are provided on the reels 3a and 3b, to thereby decrease the distance between reels 3a and 3b, which in turn leads to a miniaturization of the overall physical cassette size. However, without flange members, the tape may be wound on the reels 3a and 3b non-uniformly in a width wise direction. In order to eliminate this defect, i.e., to prevent the tape from contacting with the inner walls of the cassette halves 1a and 1b, and in order to achieve such prevention without causing any substantial additional friction, a space is provided between the tape and each inner wall of the cassette halves 1a and 1b, and a sheet 5a or 5b which is a so called "retainer" is interposed in this space so that the reels 3a and 3b are retained at a suitable position within the case 1.

A pair of guide rollers 6a and 6b, a pressure pad 7, and the like are encased in the case together with the tape 2 and the reels 3a and 3b. In the walls of the case 1 are formed a pair of capstan shaft insertion holes 8a and 8b, positioning pin insertion holes 9a, 9b, 9c and 9d, a pair of pinch roller insertion holes 10a and 10b, reel shaft insertion holes 11a and 11b, and a magnetic head insertion hole 12. Reference characters 3a' and 3b' denote engagement lips formed at an angular interval of 60° on the circumferential periphery of the reel 3a or 3b.

On the other hand, the cassette tape recorder comprises a pair of reel shafts 20a and 20b, a capstan shaft 21, a pinch roller 23 and a magnetic head 24. When the tape cassette 1 is mounted on the tape recorder, the reel shafts 20a and 20b are inserted through the reel shaft insertion holes 11a and 11b into the interior of the tape cassette 1 and engage with the reels 3a and 3b. At the same time, the capstan shaft 21 is inserted into the capstan shaft insertion hole 8a. Then, when the tape recorder is played, the pinch roller 23 is inserted through the pinch roller insertion hole 10a into the interior of the tape cassette 1 to clamp the tape 2 against the capstan shaft 21 so that the pinch roller cooperates with the capstan shaft 21 rotating at a constant speed to move the tape 2 at a constant speed. At the same time, the magnetic head 24 is inserted through the magnetic head insertion hole 12 into the interior of the cassette case 1 to clamp the tape 2 against the pressure pad 7 to thereby reproduce the information recorded on the tape 2.

In the thus described play condition, the reel shaft 20a serves to take up the tape 2 and is driven by a drive source (not shown), whereas the reel shaft 20b serves to feed the tape 2 and is not driven by the source, but instead the reel shaft 20b is adapted to apply a constant back tension to the tape 2.

The reel shaft 20b on the supply side of conventional construction is shown in FIGS. 5 and 6, wherein the character C denotes a chassis of the cassette tape recorder, from which an upright shaft $20b_1$ extends vertically. A reel shaft member $20b_2$ having a regular hexagonal cross section is freely rotatably mounted on the upright shaft $20b_1$. A cylindrical hub $20b_3$ surrounds the shaft $20b_2$ so as to be slidable in the axial direction but to positively engage with the shaft member $20b_2$ with respect to the horizontal or rotational direction. The cylindrical hub $20b_3$ is biased to move in one direction by a spring $20b_4$ interposed between the bottom surface of the hub and the facing portion of the shaft member $20b_2$. The hub $20b_3$ is held at a position shown by a retaining member $20b_5$ tightly engaged with the shaft member $20b_2$.

As described above, the shaft member $20b_2$, the cylindrical hub $20b_3$, the spring $20b_4$ and the retaining member $20b_5$ are formed in a unit which is prevented from being pulled apart from the upright shaft $20b_1$ by means of a stopping member $20b_6$ mounted on the top end of the urpight shaft $20b_1$, as shown in FIG. 5. A leaf spring $20b_7$ interposed between a flanged portion of the upright shaft $20b_1$ and the shaft member $20b_2$ is provided in order to produce a constant frictional force between the reel shaft unit and the upright shaft $20b_1$ to thereby apply a back tension to the tape 2. With the thus constructed reel shaft 20b, when the tape cassette is inserted, if the reel lips 3b' of the cassette are not properly meshed with the outer projections $20b'_3$ of the cylindrical hub $20b_3$, the cylindrical hub $20b_3$ may be pressed downwardly so that no damage occurs. If a simpler construction is desired, as shown in FIG. 7, projections $20b'_2$ may be formed directly on the shaft member $20b_2$ with the shaft member rotatably mounted on the upright shaft $20b_1$. The leaf spring $20b_7$ provides back tension and is also provided with somewhat more bending range.

Now, when the above-described tape recorder is in the play condition, let us assume that an up-and-down vibration is applied thereto as shown by the arrow in FIG. 4. When the frequency of vibration is very low, e.g. about 1 Hz, the reels 3a and 3b are vibrated together with the case 1 and chassis C. However, when the frequency is increased, the reels 3a and 3b may remain relatively stationary while only the case 1 vibrates vertically together with the chassis C. For this reason, the upper and lower inner walls of the case 1 collide against the reels 3a and 3b with high energy. In such a condition, the tape 2 may be elongated or shortened between the point a on the tape 2 clamped between the capstan shaft 21 and the pinch roller 23 and the point b at the winding end of the reel 3b.

It is to be noted that the tape 2 between the above described points a and b has a resonance at a resonance frequency $f_0$ which is determined according to the spring constant of the tape 2 and the inertial moment of the tape wound on the reel 3b. Now, when the value of $f_0$ is calculated with a typical back tension of 2 to 3 g, a value of $f_0 = 30-40$ Hz, is derived.

When the cassette tape recorder is in its play condition, as shown in FIG. 8a, the projections 3b' of the supply reel 3b are engaged with the projections 20b'$_3$ of the reel shaft 20b so that the projections 3b' rotate the reel shaft 20b while the supply reel is rotated in the direction of the arrow. However, when the above noted resonance is generated, the rotation of the reel 3b may be stopped by the elongation of the tape 2 as shown in FIG. 8b. Thereafter, due to the reduction of the tape, the reel 3b is rapidly rotated to thereby rotate the reel shaft 20b with high energy and at a higher speed as shown in FIG. 8c. For this reason, a reactive force occurs whereby the shaft projections 20b'$_3$ push back on the reel projections 3b' so that, with the next elongation of the tape 2, the projections 3b' and 20b'$_3$ of both members are separated from each other as shown in FIG. 8d. Once such a state is generated, collision and reaction are alternately generated between the projections 3b' and 20b'$_3$ to thereby cause a so-called jitter. As a result, the travelling speed of the tape 2 on the surface of the magnetic head 24 is changed, which causes wow to be generated at about 40 Hz.

SUMMARY OF THE INVENTION

It is therefore an object of this invention to provide a mechanism for eliminating wow due to vertical vibrations imparted to a cassette tape machine.

Briefly, this is achieved by a braking mechanism that applies a frictional drag force to the reel shaft and/or reel hub when vertical vibrations are encountered. The magnitude of the braking force is preferably variable with the amount of vibration. In one embodiment the braking force is applied radially to a member rotatable with the reel shaft. In a second embodiment the reel shaft or hub is raised axially.

BRIEF DESCRIPTION OF THE DRAWINGS

The invention will be more fully understood from the following description in conjunction with the accompanying drawings, in which:

FIG. 1 is a graph showing the wow characteristics of a prior art cassette tape recorder, before auditory compensation;

FIG. 2 is a graph showing the wow characteristics of the same cassette tape recorder as in FIG. 1, after auditory compensation;

Figures 5, 6, 7, 8:
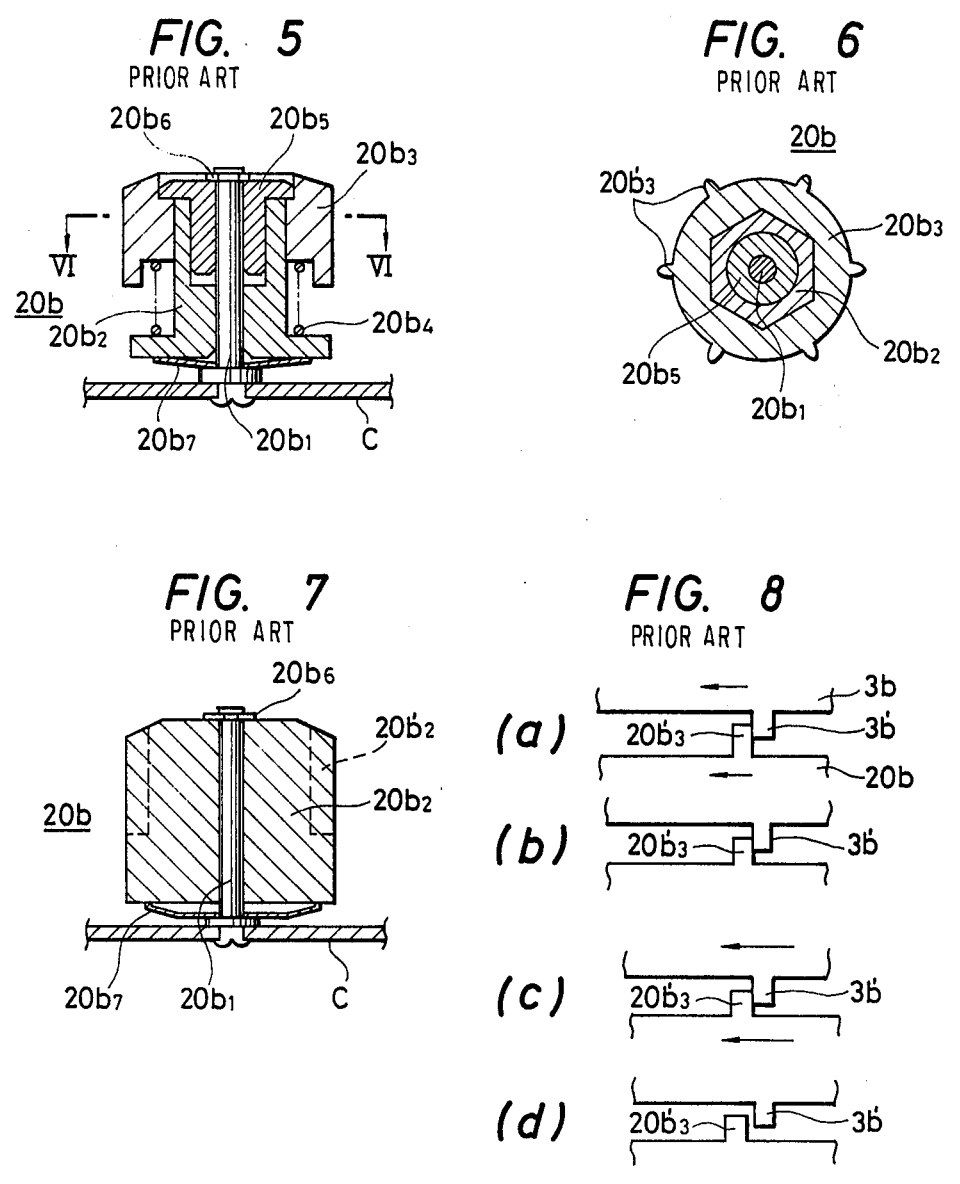

FIG. 5 is a cross sectional view showing a conventional tape supply reel shaft;

FIG. 6 is a cross sectional view of the reel shaft taken along the line VI—VI of FIG. 5;

FIG. 7 is a cross sectional view showing another conventional tape supply reel shaft;

FIG. 8a to 8d illustrate a resonance problem caused in the conventional tape supply reel shafts;

DETAILED DESCRIPTION OF THE INVENTION

Figure 3:
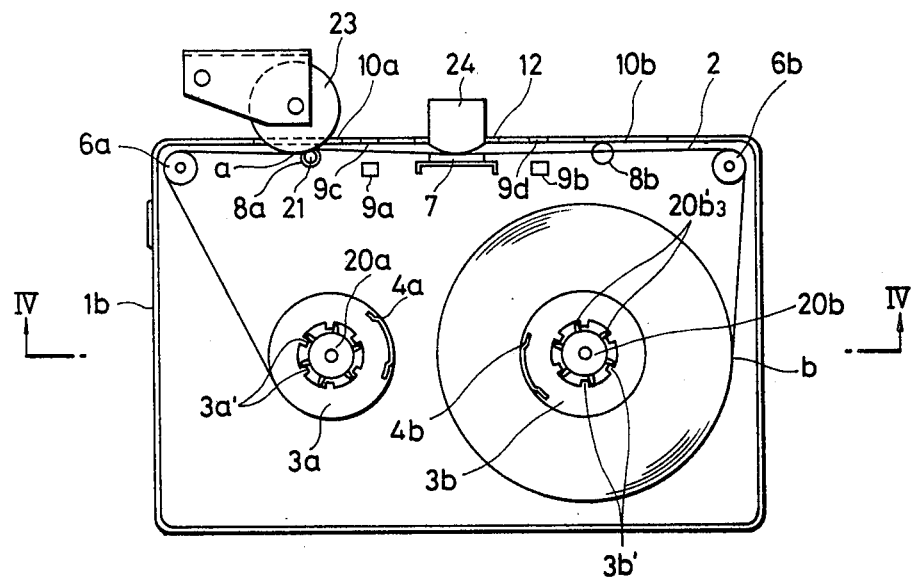
FIG. 3 is a plan view showing a prior art cassette from which an upper half has been removed, together with the essential components of a recorder, as tested for the graphs in FIGS. 1 and 2.
Figure 4:
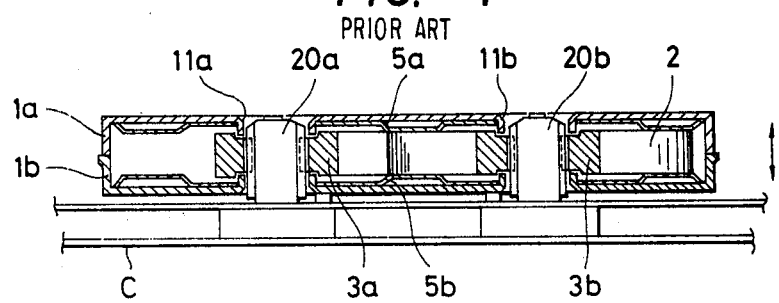
FIG. 4 is a cross sectional view of the cassette tape and recorder taken along line IV—IV of FIG. 3.

Embodiments of the present invention will now be described with reference to FIGS. 9 to 30, in which the same reference characters as in FIGS. 3 to 8 are used to designate like members and components.

Figure 9:
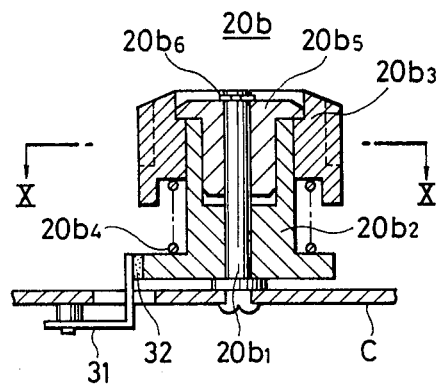
FIG. 9 is a cross sectional view of a reel shaft portion of a cassette recorder employing the braking means according to a first embodiment of the present invention.
Figure 10:
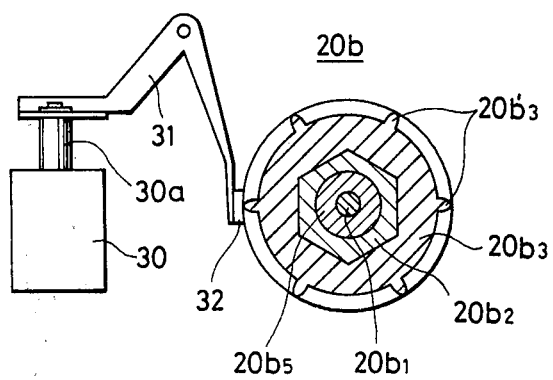
FIG. 10 is a view taken along line X—X of FIG. 9.

FIGS. 9 and 10 show a brake or damper device which is adapted to apply a braking force to a reel shaft 20b for use with a one way type cassette tape recorder. The brake device is provided with a solenoid 30 fixed to the chassis C and a rotary lever 31 coupled at one end to a movable iron core 30a of the solenoid. A brake pad fixed to the other end of the rotary brake lever 31 may be in contact with a circumferential surface of the shaft member $20b_2$ of the reel shaft unit 20b to thereby apply a braking force thereto.

Figure 11:
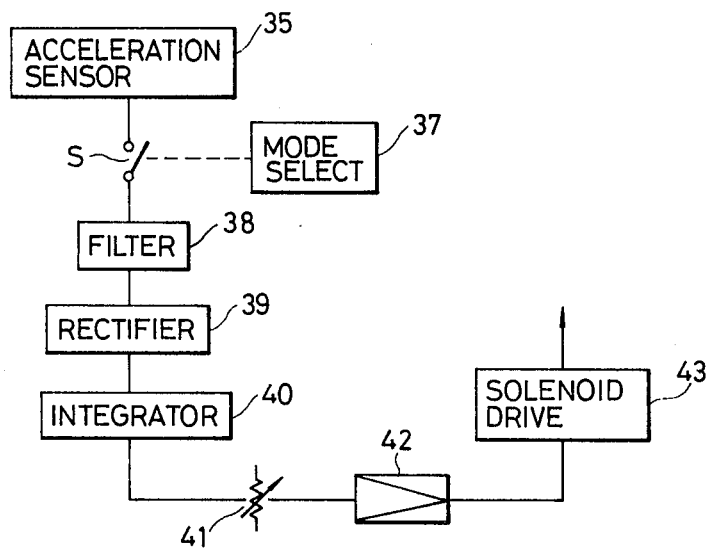
FIG. 11 is a block diagram of a control circuit for the braking means of the present invention.
Figure 12:
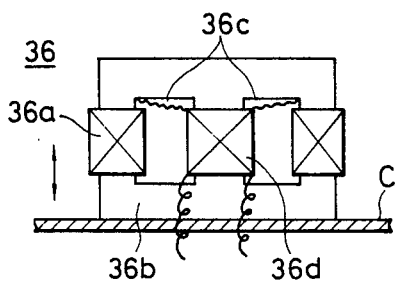
FIG. 12 is an illustration of the speed detection portion of the acceleration sensor in FIG. 11.

The amount of braking force of the solenoid 30 may be changed by controlling the current supplied from a control circuit shown in FIG. 11. In FIG. 11, a reference numeral 35 designates an acceleration speed sensor which is composed of a speed detector 36 mounted on the chassis C as shown in FIG. 12 and a differential circuit for differentiating an output of the detector. Speed detector 36 is made up of a detecting coil 36d supported by a damper 36c, which is displaceable with respect to a magnetic core 36b energized by an activating coil 36a. A signal in proportion to the speed in the vertical direction of the chassis C is produced at lead lines of the coil 36d.

Figure 13:
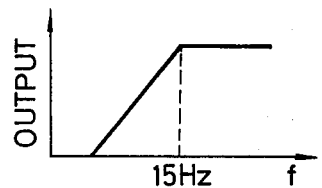
FIG. 13 is a graph illustrating the frequency response characteristic of the filter in FIG. 11.

An acceleration speed signal from the acceleration sensor 35 is applied to a filter 38 through a switch S which is turned on by the mode selecting circuit 37 during play. The filter 38 has a characteristic such that components having a frequency above 15 Hz are passed as shown in FIG. 13. The signal of these frequency components passed through the filter is subsequently converted into a direct current signal by a rectifier 39, and thereafter, is applied to an integrating circuit 40. The integrating circuit then produces an output signal while integrating the input signal. With this circuitry, a rapid change in the above described current signal will be damped and converted to a signal which is gradually increased or decreased. The output signal of the integrating circuit 40 is inputted into a drive circuit 43 through an adjuster 41 and an amplifier 42.

Figure 14:
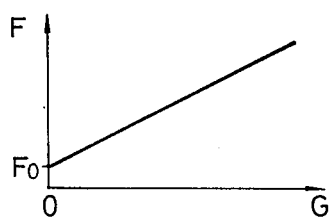
FIG. 14 is a graph illustrating the applied braking force.
Figure 15:
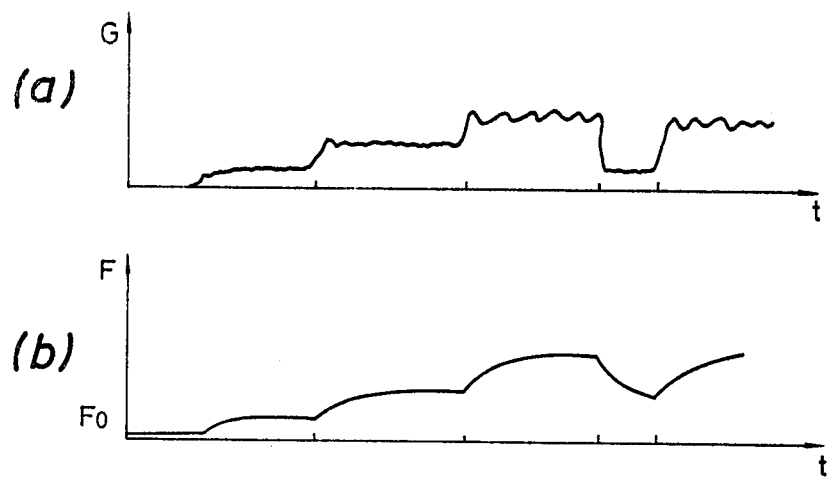
FIGS. 15a and 15b are graphs illustrating the correspondence between the detected vertical acceleration and the applied braking force.

The drive circuit 43 serves to make a current to flow in response to the magnitude of the output of the integrating circuit 40. However, even if no vertical vibration is applied to the tape recorder, a constant current is made to flow through a solenoid 30. As shown in FIG. 14, the output level of the integrating circuit 40 is adjusted by the adjustor 41 so as to apply a constant braking force $F_o$ to the reel shaft 20b in the absence of vertical vibration. The constant braking force $F_o$ is applied to the tape 2 in order to generate a back tension of about 3 g.

Figure 16:
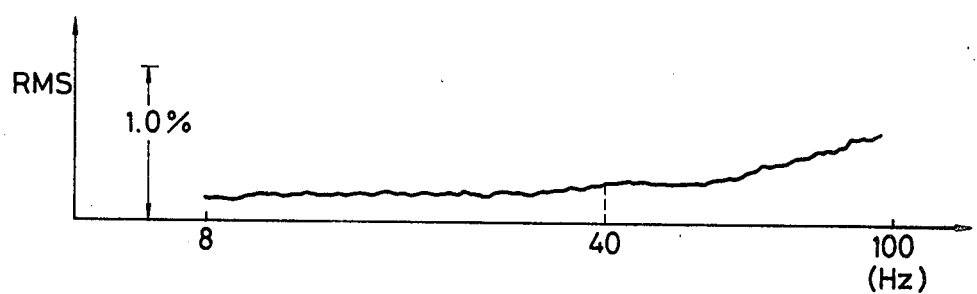
FIGS. 16 and 17 are graphs corresponding to FIGS. 1 and 2 and illustrating the wow characteristics in a cassette recorder employing the first embodiment of the present invention.
Figure 17:
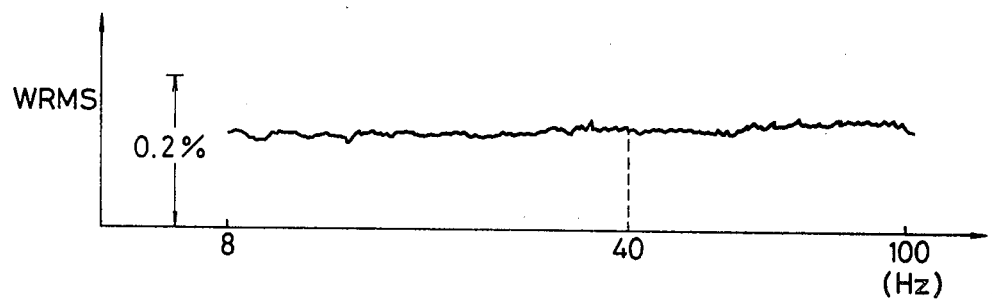

With such a control circuit, when the acceleration speed G which varies as shown in FIG. 15a in the vertical direction is applied to the tape recorder, the braking force F which is applied to the reel shaft 20b is controlled as shown in FIG. 15b. Therefore, when a vertical vibration of a specific frequency is applied to the tape recorder, the back tension to the tape 2 is increased and the resonance frequency of the tape is changed. For this reason, when vertical vibration of 1 G is applied to the cassette tape recorder according to the present invention, wow exceeding 1% before the auditory compensation are shifted above 100 Hz as shown in FIG. 16 and wow after auditory compensation is reduced below 0.2% over the effective range as shown in FIG. 17.

Figure 18:
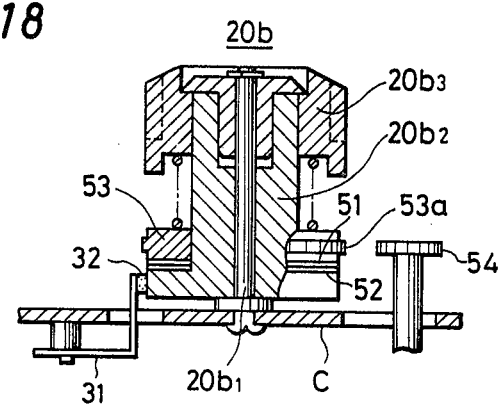
FIGS. 18 and 19 are cross sectional views of variations of the first embodiment adopted for bidirectional tape machines.
Figure 19:
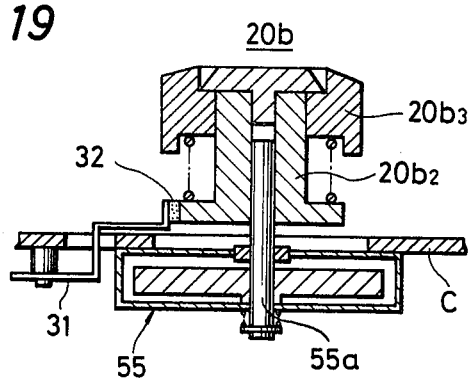

FIGS. 18 and 19 show a reel shaft unit 20b for use with a bi-directional type cassette tape recorder in which the tape travels in either direction. In this case, the reel shaft 20b is used both as a take-up reel and as a tape supply reel, which requires a few additional components. More specifically, in the embodiment shown in FIG. 18, a plulley 53 is coupled to the shaft member $20b_2$ through a friction mechanism composed of felts 51 and 52 pressingly coupled to each other by a spring $20b_4$, and a gear 53a formed on the circumference of the pulley 53 is selectively engaged with a gear 54 rotated by a drive source (not shown).

In FIG. 19, the reel shaft unit is fixed to a rotary shaft 55a of a flat shaped motor 55 which is rotated when the reel shaft unit 20b is used to drive a take-up reel.

Figure 20:
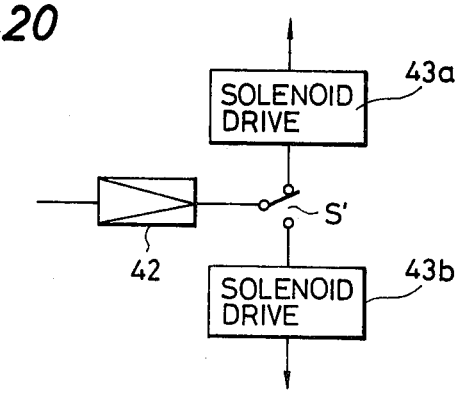
FIG. 20 illustrates a modification of the control circuitry required for a bidirectional tape machine.
Figure 21:
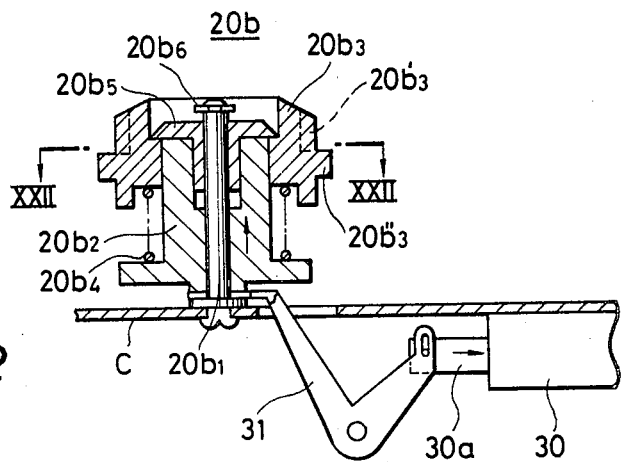
FIG. 21 is a cross sectional view of a reel shaft employing a second embodiment of the present invention.
Figure 22:
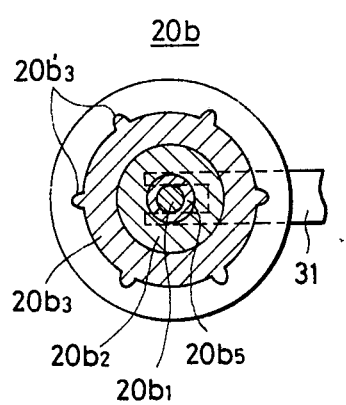
FIG. 22 is a plan view along lines XXII—XXII of FIG. 21.

In the bi-directional cassette tape recorder, a pair of solenoids 30 are formed or provided, one for each reel shaft, which requires two drive circuits 43a and 43b as shown in FIG. 20. By a switch S' changeable in response to the tape travelling direction, the output of the amplifier 42 is connected to the drive circuits 43a and 43b corresponding to the reel shaft which serves as a tape supply reel.

Other variations of the present invention will now be described with reference to FIGS. 21 to 29, in which the same reference characters used in FIGS. 3 to 8 are used to designate like members or components.

FIGS. 21 to 24 show a reel shaft unit 20b on the tape supply side used with a one way type cassette tape recorder. The reel shaft unit 20b is provided with a hub $20b_3$ having projections $20b_3$ for engaging the projections 3b' of the reel 3b. Beneath the projections $20b'_3$ the hub includes a flange $20b''_3$ on which projections 3b' of a reel 3b of the cassette case may rest. The reel shaft unit is rotatably supported on an upright shaft $20b_1$ and slidable along the upright shaft $20b_1$. When a solenoid 30 fixed to the chassis C is energized, the shaft unit is lifted in the direction indicated by the arrow by a rotational lever 31 coupled to a movable iron core 30a.

Figure 23:
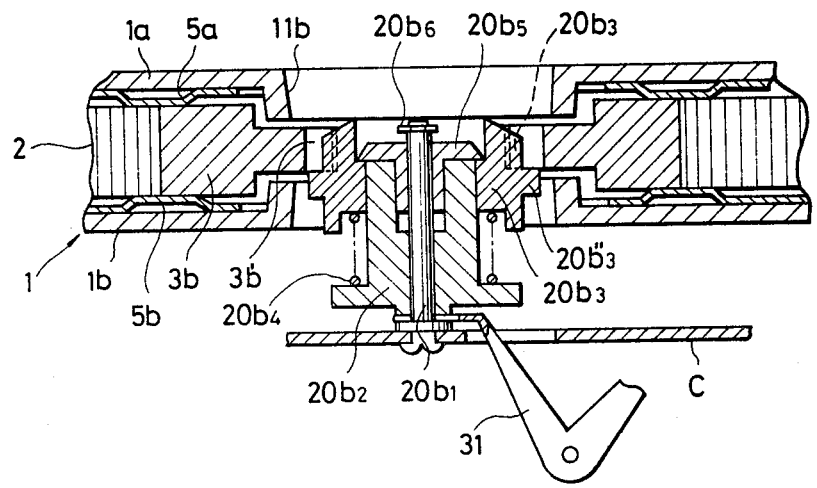
FIG. 23 is a side sectional view of the embodiment of FIG. 21 in cooperation with a tape cassette when no braking force is applied.
Figure 24:
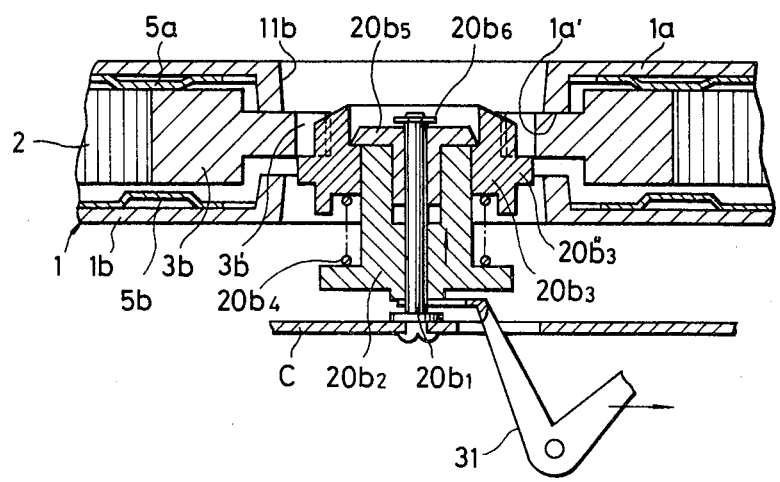
FIG. 24 is a view similar to FIG. 23 after a braking force has been applied.

FIG. 23 shows the state in which the projections 3b' of the reel 3b of the cassette mounted on the tape recorder are laid on the flange $20b''_3$ of the cylindrical hub $20b_3$. In this condition, when the tap recorder is in the play condition, the solenoid 30 is energized so that, as shown in FIG. 24, the reel 3b is lifted until the reel 3b is in contact with the wall 1a' of the upper half 1a of the cassette case 1 and with the upper sheet 5a. In this case, the contacting force is very weak but sufficiently large so that friction is generated between the reel 3b and the wall 1a' for purposes of back tension. However, when the vertical vibration is applied to the tape recorder, a current flowing through the solenoid 30 is controlled by the control circuit to thereby increase the contacting force.

The control circuitry for the embodiment of FIGS. 21-24 is the same as that described above for the first embodiment. In this embodiment also, when there is no vertical acceleration applied to the tape recorder, a minimum braking force for back tension purposes is still applied whenever a given reel is operating as the supply reel. Thus, Even if the acceleration speed G is at zero, the reel 3b is in contact with the wall 1a' at a constant pressure of $F_o$.

Figure 25:
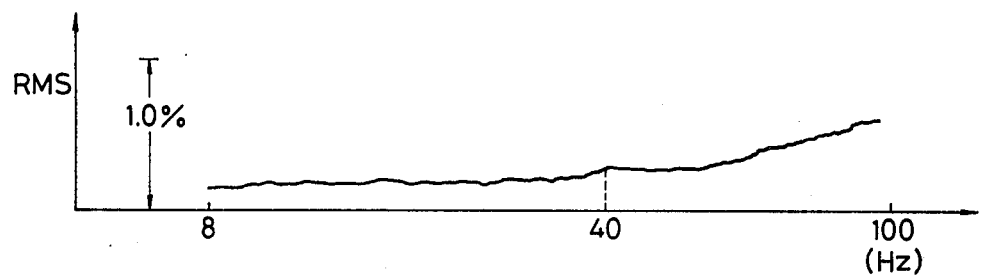
FIGS. 25 and 26 are graphs similar to FIGS. 1 and 2, respectively, illustrating the improved wow characteristics according to the second embodiment of this invention.
Figure 26:
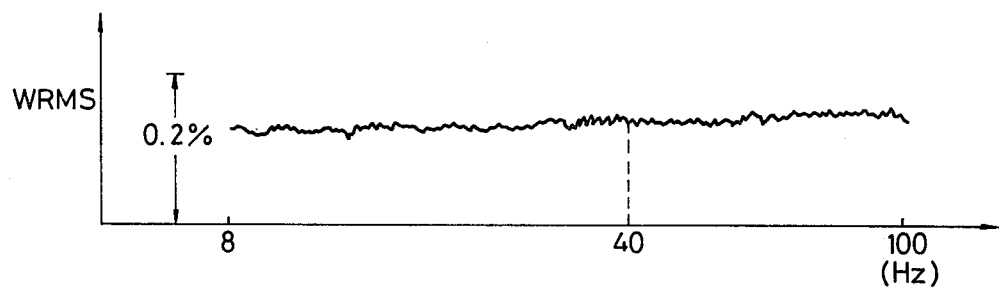

In this embodiment when vertical vibration is applied to the tape recorder such that the acceleration G is changed, the contacting force F of the reel 3b against the wall 1a' of the cassette case 1 is controlled in similar manner as shown in FIG. 15b. Therefore, the reel 3b is vibrated vertically at a predetermined frequency, for example at about 40 Hz, whereupon the resonance of the tape 2 can be substantially prevented. For this reason, the wow characteristics of the cassette tape recorder are as shown in FIGS. 25 and 26, in which wow at about 40 Hz of 1% or more before auditory compensation and wow of 0.2% or more after auditory compensation are completely eliminated.

Figure 27:
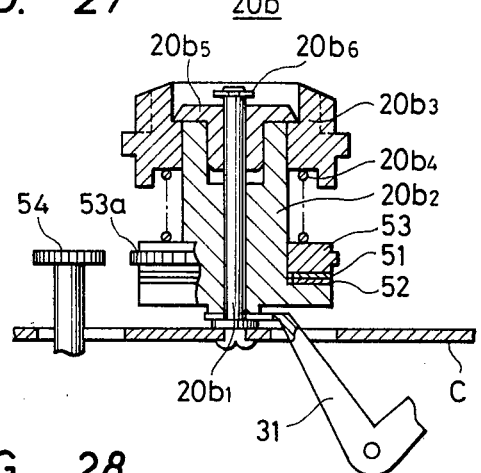
FIGS. 27 and 28 are side sectional views of variations of the second embodiment adapted for bidirectional tape machines.
Figure 28:
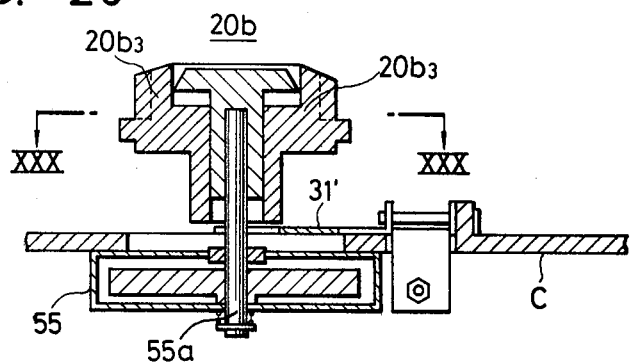
Figure 29:
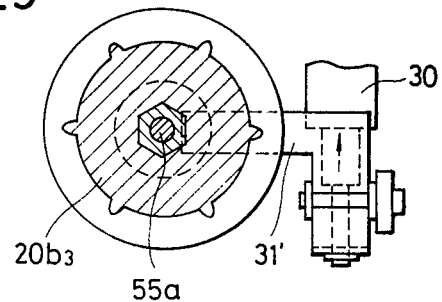
FIGS. 29 is a plan, part-sectional, view along lines XXIX—XXIX of FIG. 28.

FIGS. 27 to 29 show various reel shaft units 20b used with a bi-directional type cassette tape recorder in which the tape is allowed to travel in either direction. In this case, the reel shaft unit is used both as a take-up reel and as a supply reel, which requires additional structures or components. More specifically, in the embodiment shown in FIG. 27, a pulley 53 is provided to the unit, the pulley being coupled to the shaft member $20b_2$ through a friction mechanism composed of felts 51 and 52 which are urged in contact with each other by a spring $20b_4$. On the circumference of the pully 53 is formed a gear 53a which may be engaged with a gear 54 driven by a drive source (not shown).

In FIGS. 28 and 29, the reel shaft unit 20b is mounted fixedly on the rotary shaft 55a of a flat shaped motor 55 which is rotated when the reel shaft unit 20b is used as a tape winding reel. In this embodiment, the rotary shaft 55a of the motor 55 cannot be lifted by the rotary lever 31'. Therefore, an extension of the cylindrical hub $20b_3$ is engaged with the rotary lever 31' so that only the cylindrical hub $20b_3$ is moved.

In the bidirectional recorder, since plural solenoids 30 are provided, a pair of drive circuits 43a and 43b will be provided in the same manner as in FIG. 20.

It should be appreciated that the above embodiments are by way of example only, and that the scope of the invention is as defined in the appended claims. For example, without departing from the scope of this invention, it would be possible to employ a braking mechanism in combination with the frictional back tension provided by the spring $20b_7$ of FIG. 5, with the additional braking means being operable only with detected vibration whereby the adjustment means 41 would be unnecessary or be adjusted for zero output in the absence of vibration since the back tension force $F_o$ would already be applied.

What is claimed is:

1. A cassette tape machine comprising:
    at least one rotatable shaft member;
    a hub coupled for rotation with said shaft member and having means for engaging a reel on a tape cassette, said reel rotating said hub in a supply direction when said reel acts as a supply reel;
    means for detecting vertical vibration of said cassette tape machine; and
    braking means for applying a predetermined braking force to said reel in response to said detected vertical vibration of said machine.

2. A cassette tape machine as claimed in claim 1, wherein said braking means comprises friction means for frictionally engaging said shaft member.

3. A cassette tape machine as claimed in claim 2, wherein said friction means engages a circumferential surface of said shaft member.

4. A cassette tape machine as claimed in claim 1, wherein said braking means comprises means for pressing in an axial direction against said hub.

5. A cassette tape machine as claimed in claim 4, wherein said hub has a portion thereon for urging said reel in an axial direction when said hub is pressed in its axial direction, whereby upon operation of said braking means said reel is urged axially into frictional engagement with a stationary portion of said cassette.

6. A cassette tape machine as claimed in claim 4, wherein said shaft member and hub are coupled via coupling means for axial movement together, and said hub is pressed in an axial direction by pressing said shaft member in its axial direction.

7. A cassette tape machine as claimed in claim 6, wherein said coupling means comprises a spring for urging said hub axially when said shaft member is pressed in an axial direction.

8. A cassette tape machine as claimed in any one of claims 1-7, wherein said predetermined braking force is determined by a frequency of said vertical vibration detected by said detecting means.

9. A cassette tape machine as claimed in claim 8, wherein said braking force is maintained at a predetermined non-zero level in the absence of detected vibration.

10. A cassette tape machine as claimed in claim 1, wherein said vertical vibration detecting means includes an acceleration speed sensor which includes a speed detector mounted on a chassis in a differential circuit for differentiating an output of said speed detector.

* * * * *